United States Patent [19]

Frisbee et al.

[11] 4,431,925
[45] Feb. 14, 1984

[54] BATTERY JUMPER CABLE ASSEMBLY

[75] Inventors: Claude M. Frisbee; Henry R. Logan, both of Bettendorf, Iowa

[73] Assignee: J. I. Case Company, Racine, Wis.

[21] Appl. No.: 407,228

[22] Filed: Aug. 11, 1982

[51] Int. Cl.³ .................. H02J 7/34; H02G 11/00; H01H 9/00
[52] U.S. Cl. .................. 307/10 R; 200/16 C; 200/16 F
[58] Field of Search ............... 200/16 B, 16 C, 16 D, 200/16 E, 51 R; 320/2, 25; 307/10 R; 335/1, 2, 219

[56] References Cited

U.S. PATENT DOCUMENTS

| | | | |
|---|---|---|---|
| 2,908,827 | 10/1959 | Hickman | 200/16 D X |
| 2,933,566 | 4/1960 | Muller | 200/16 F X |
| 3,281,816 | 10/1966 | Raymond | 200/51 R X |
| 4,286,172 | 8/1981 | Millonzi et al. | 320/25 X |

*Primary Examiner*—J. R. Scott
*Attorney, Agent, or Firm*—Cullen, Sloman, Cantor, Grauer, Scott & Rutherford

[57] ABSTRACT

A battery jumper cable assembly for preventing electrical sparking when a pair of batteries are connected together. The battery cable assembly includes a ground wire and a power wire which with a switch assembly being connected at a location along the length of the power wire. The switch assembly includes a housing for a slidable switch element having an electrically conductive contact plate. The switch element is biased toward a normally open or off position by a spring. The power wire includes spaced apart contacts within the housing and the switch contact plate is movable to bridge the gap between the contacts. An electromagnet is mounted within the housing in alignment with the slidable switch element, and the electromagnet is electrically connected to the ground wire and to a contact element within the switch housing. The switch element is manually movable to a closed or on position wherein the contact plate slidably engages the electromagnet and forms an electrical bridge between the power wire contacts and electromagnet contact element thereby energizing the electromagnet for magnetically holding the contact plate in position until the circuit between the batteries is broken.

1 Claim, 3 Drawing Figures

4,431,925

BATTERY JUMPER CABLE ASSEMBLY

BACKGROUND OF THE INVENTION

The present invention relates to a battery jumper cable assembly which prevents electrical sparking when a pair of batteries are connected together.

It is conventional to use battery cables for electrically connecting a pair of batteries together in parallel for jump starting an engine when the battery for the engine is dead or its electrical charge is depleted. A problem associated with known battery jumper cables is that an electrical spark occurs at one of the batteries when the batteries are connected together. If battery gas or hydrogen is present, the electrical sparking at the battery may result in an explosion causing battery damage or possible personal injury. Thus, there has been a need for a battery jumper cable assembly which prevents electrical sparking at a battery when a pair of batteries are connected together.

SUMMARY OF THE INVENTION

In accordance with the present invention, a battery jumper cable assembly is provided which prevents electrical sparking at a battery when a pair of batteries are connected together.

The battery jumper cable assembly includes a ground wire and a power wire with the ground and power wires being connected at their opposite ends to conventional clamps. The clamps are connected to the ground and power terminals of a pair of batteries as is conventional. The ground and power wires are encased within electrically resistive cables which are joined together along a substantial part of their lengths.

A switch assembly is connected at a location along the length of the power wire to prevent sparking at either battery when the clamps are connected to the battery terminals. The switch assembly includes a housing for a manually operable slider type switch element having an electrically conductive contact plate. The switch element is biased toward a normally open or "off" position by a spring. The power wire is broken within the switch housing and includes spaced apart fixed contact elements. The switch contact plate is slidably movable to bridge the gap between the contact elements thereby providing an electrically conductive path between the broken ends of the power wire.

An electromagnet is mounted within the switch housing is alignment with the slidable switch element. The electromagnet is electrically connected to the ground wire and to a contact within the switch housing. When the slidable switch element is moved to a closed or "on" position, the switch contact plate slidably engages the electromagnet and forms an electrical bridge between the power wire contact elements and the electromagnet contact thereby energizing the electromagnet. Upon being energized, the electromagnet magnetically holds the switch element contact plate in its bridge position until one or more of the clamps are disconnected from the battery terminals. Then, the spring returns the switch element and contact plate to an open or "off" position.

The battery cable assembly of the present invention prevents sparking when a pair of batteries are connected together in parallel. The circuit between the batteries is not completed until the slidable switch element and contact plate are manually moved to the closed or "on" position. If there is a spark, it will occur within the switch housing well away from either battery. Further, when the clamps are disconnected from the battery terminals, the switch element and contact plate will automatically return to an open or "off" position which prevents the cable assembly from being inadvertently connected between the batteries with the slidable switch element being in the "on" position.

Other advantages and meritorious features of the battery jumper cable assembly of the present invention will be more fully understood from the following description of the preferred embodiment, the appended claims, and the drawings, a brief description of which follows.

DETAILED DESCRIPTION OF THE INVENTION

Figure 1:
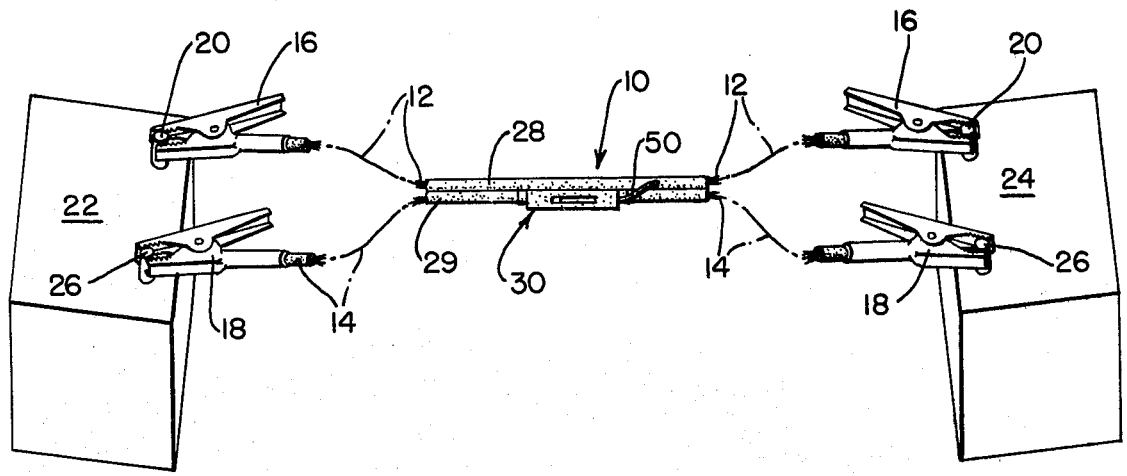
FIG. 1 is a top plan view of the battery jumper cable assembly of the present invention connected between a pair of batteries.
Figure 2:
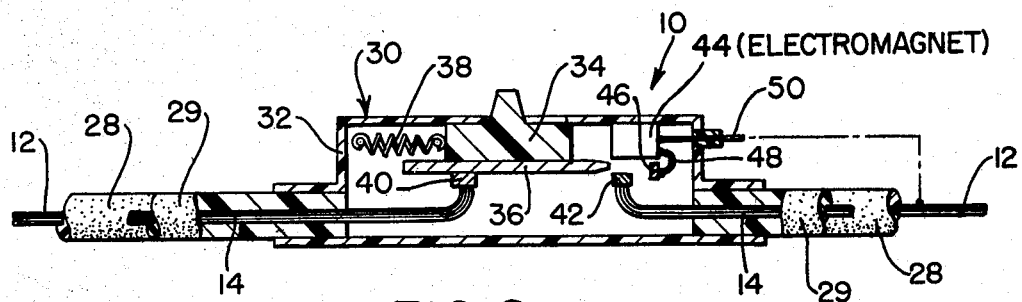
FIG. 2 is an enlarged side elevational view of the switch assembly partly in cross section illustrating the "off" position of the switch.
Figure 3:
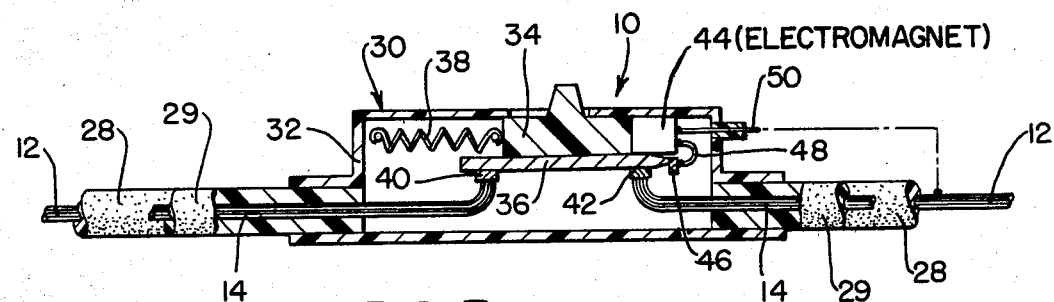
FIG. 3 is an enlarged side elevational view of the switch assembly partly in cross section illustrating the "on" position of the switch.

A preferred embodiment of the battery jumper cable assembly made in accordance with the teachings of the present invention is illustrated in FIGS. 1–3.

Cable assembly 10 includes a ground wire 12 and a power wire 14 with ground wire 12 being connected at its opposite ends to clamps 16 and power wire 14 being connected at its opposite ends to clamps 18. Clamps 16 are connected to the ground terminals 20 of a pair of batteries 22 and 24 while clamps 18 are connected to the power terminals 26 as is conventional. Wires 12 and 14 are encased within electrically resistive cables 28 and 29 which are joined together along a substantial part of their lengths as shown in FIG. 1.

A switch assembly 30 is connected at a location along the length of power wire 16 to prevent sparking at either battery 22 or 24 when clamps 16 and 18 are connected to the battery terminals 20 and 26. Switch assembly 30 includes a housing 32 for a manually operably slider type switch element 34 having an electrically conductive contact plate 36. Switch element 34 is biased toward a normally open or "off" position as shown in FIG. 2 by spring 38. Power wire 14 is broken within switch housing 32 and includes spaced apart fixed contact elements 40 and 42. Contact plate 36 is slidably movable to bridge the gap between contacts 40 and 42 as shown in FIG. 3 thereby providing an electrically conductive path between the broken ends of power wire 14.

An electromagnet 44 is mounted within housing 32 in alignment with slider switch element 34. Electromagnet 44 is electrically connected to contact 46 by line 48 and to ground wire 12 by line 50. When slider switch element 34 is moved to a closed or "on" position as shown in FIG. 3, contact plate 36 slidably engages electromagnet 44 and forms an electrical bridge between contacts 40, 42 and 46, thereby energizing electromagnet 44. Upon being energized, electromagnet 44 magnetically holds contact plate 36 and switch element 34 in the position as illustrated in FIG. 3 until one or more of the clamps 16 and 18 are disconnected from battery terminals 20 and 26. Then, spring 38 returns switch 24 and contact plate 36 to an open or "off" position as shown in FIG. 2.

As described, cable assembly 10 prevents electrical sparking at either battery 22 or 24 when clamps 16 and 18 are connected between battery terminals 20 and 26. The circuit between batteries 22 and 24 is not completed until slidable switch element 34 and contact plate 36 are manually moved to the closed or "on" position illustrated in FIG. 3. If there is an electrical spark, it will occur within switch housing 32 well away from batteries 22 or 24. Further, when clamps 16 and 18 are disconnected, switch element 34 will automatically return to an open or "off" position as shown in FIG. 2 which prevents cable assembly 10 from being inadvertently connected between batteries 22 and 24 with switch element 34 in the "on" position of FIG. 3.

It will be apparent to those skilled in the art that the foregoing disclosure is exemplary in nature rather than limiting, the invention being limited only by the appended claims.

We claim:

1. A battery jumper cable assembly for connecting a pair of batteries, said cable assembly including:

a ground wire and a power wire with said wires being connected at their opposite ends to clamping means and said clamping means being connected to said batteries;

a switch assembly connected along the length of said power wire, said switch assembly including a housing for a manually operable slidable switch element having an electrically conductive contact plate, said switch element mounted on said contact plate with said contact plate being of a greater length than said switch element for extending beyond the ends of said switch element, said switch element being biased toward a normally open or off position by spring means;

said power wire including spaced apart contacts within said housing and said contact plate being slidably movable across said contacts to bridge the gap between said contacts;

an electromagnet mounted within said housing in alignment with an end of said slidable switch element, said electromagnet being electrically connected to said ground wire and to a contact element within said housing, said contact element being aligned with an end of said contact plate and spaced from said power wire contacts; and said switch element being manually movable against the bias of said spring means such that said contact plate first slidably engages said electromagnet and forms an electrical bridge between said power wire contacts and thereafter said switch element engages said electromagnet and said contact plate engages said electromagnet contact element thereby energizing said electromagnet for magnetically holding said contact plate in a closed or on position until one or more of said clamping means is disconnected from said batteries.

* * * * *